United States Patent [19]
Lin

[11] Patent Number: 5,996,909
[45] Date of Patent: Dec. 7, 1999

[54] WATER-PENETRABLE DRIP IRRIGATION PIPE

[76] Inventor: Ching-Bin Lin, 2F-2, No., 12, Lane 88, Min-Sheng E. Road, Sec. 3, Taipei, Taiwan, 104

[21] Appl. No.: 09/120,027

[22] Filed: Jul. 15, 1998

[51] Int. Cl.$^6$ ................................................ B05B 15/00
[52] U.S. Cl. .................... 239/542; 239/145; 239/553.3; 239/566; 239/575
[58] Field of Search .................... 239/145, 279, 239/542, 547, 562, 566, 568, 575, 553.3; 138/41; 210/459, 460, 461, 462, 465, 497.01

[56] References Cited

U.S. PATENT DOCUMENTS

| | | | |
|---|---|---|---|
| 2,798,768 | 7/1957 | Babin | 239/145 |
| 3,552,654 | 1/1971 | Thomas | 239/542 X |
| 3,777,987 | 12/1973 | Allport | 239/542 |
| 3,901,448 | 8/1975 | Babin | 239/145 |
| 3,939,875 | 2/1976 | Osborn et al. | 239/145 X |
| 4,061,272 | 12/1977 | Winston | 239/542 X |
| 4,948,295 | 8/1990 | Pramsoler | 239/542 X |

*Primary Examiner*—Andres Kashnikow
*Assistant Examiner*—Steven J. Ganey

[57] ABSTRACT

A water-penetrable drip irrigation pipe includes: a buffer tube having a water-penetrable fibrous core member clad in the buffer tube which is lengthwise formed in a main pipe as contiguous to an inside wall of the main pipe, having a plurality of water inlet holes respectively spaced apart and longitudinally formed in a bottom of the buffer tube to communicate with an interior in the main pipe, and a plurality of drip outlet holes longitudinally formed in the main pipe, whereby the water flowing in the interior of the main pipe will penetrate the fibrous core member in the buffer tube to be filtered by and frictionally dampened by the fibrous core member for discharging clean irrigation drips having decreased pressure.

10 Claims, 3 Drawing Sheets

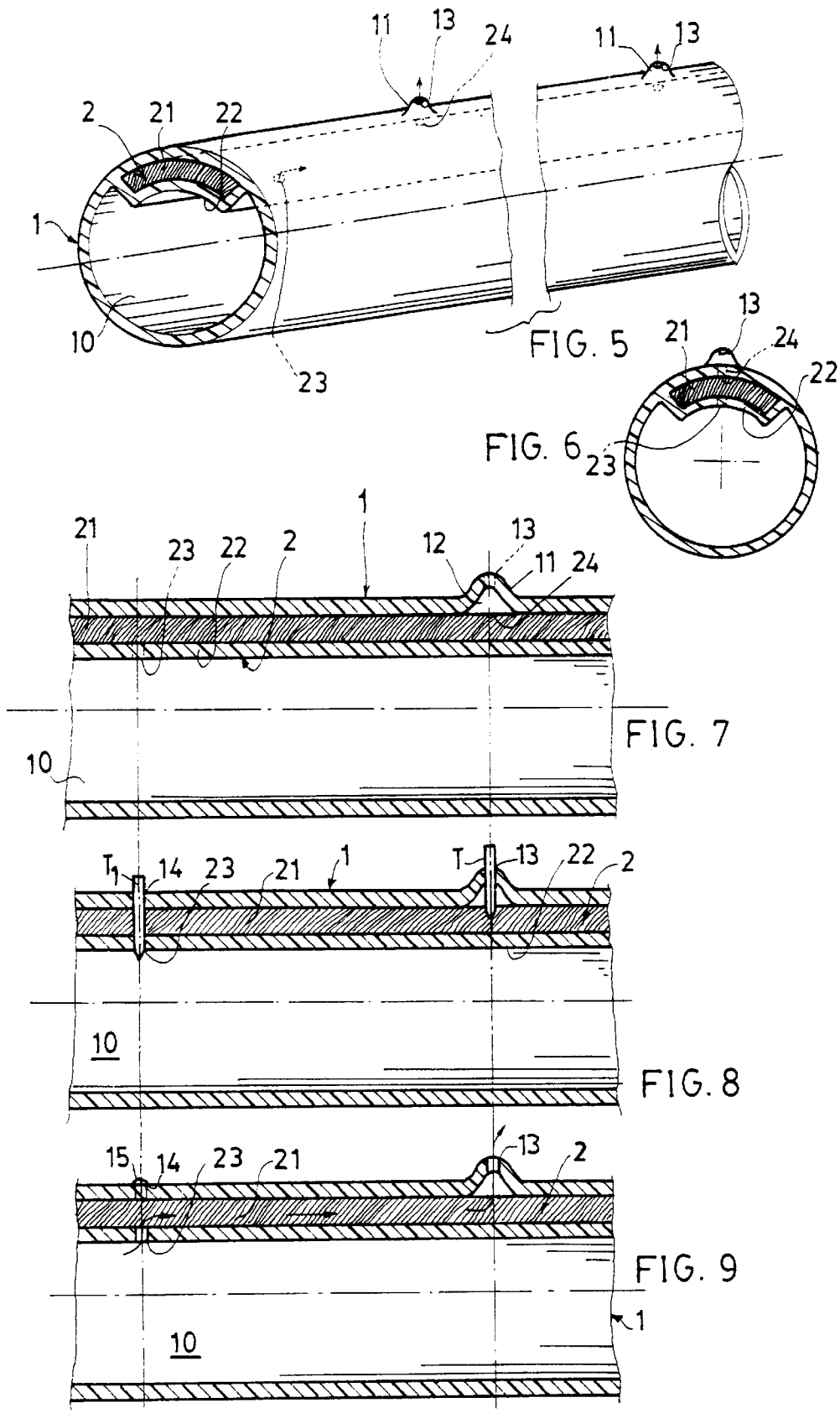

WATER-PENETRABLE DRIP IRRIGATION PIPE

BACKGROUND OF THE INVENTION

A conventional drip irrigation system as disclosed in U.S. Pat. No. 4,307,841 comprises a thermoplastic conduit having substantially discrete emitter units (3) heat welded to axially spaced apart locations of an inner surface of the conduit adjacent outlet apertures formed in the conduit, allowing irrigation liquid to flow through the groove (10) and the flexible membrane (17) to be substantially pressureless drips discharging through the apertures (2).

However, such a conventional drip irrigation system has the following drawbacks:
1. The groove (10) is corrugatedly formed in each emitter unit (3) and so many emitter units (3) must be fixed in the irrigation conduit, thereby increasing the installation inconvenience and the production cost.
2. The flexible membrane (17) is retained by the flanges (14) to constitute an emitter cover to define a flow restricting flowpath with the elongated groove (10), not for filtering the irrigation liquid, thereby lacking of water filtration effect.
3. The irrigation liquid does not flow through (penetrate into) the flexible rubber membrane (17) in order to greatly reduce the fluid pressure due to friction loss. So, the reduction of fluid pressure relies upon the elongated groove (10) which is corrugatedly formed in the base of the emitter unit as shown in their FIG. 2, thereby increasing the production complexity and cost.

The present inventor has found the drawbacks of conventional drip irrigation system and invented the present water-penetrable drip irrigation pipe.

SUMMARY OF THE INVENTION

The object of the present invention is to provide a water-penetrable drip irrigation pipe including: a buffer tube having a water-penetrable fibrous core member clad in the buffer tube which is lengthwise formed in a main pipe as contiguous to an inside wall of the main pipe, having a plurality of water inlet holes respectively spaced apart and longitudinally formed in a bottom of the buffer tube to communicate with an interior in the main pipe, and a plurality of drip outlet holes longitudinally formed in the main pipe, whereby the water flowing in the interior of the main pipe will penetrate the fibrous core member in the buffer tube to be filtered by and frictionally dampened by the fibrous core member for discharging clean irrigation drips having decreased pressure.

BRIEF DESCRIPTION OF THE DRAWINGS

FIG. 5 shows another preferred embodiment of the present invention.

FIG. 6 is a cross sectional drawing of FIG. 5.

FIG. 7 is a partial longitudinal sectional drawing of FIG. 5, but not yet drilled with the water inlet holes and drip outlet holes in the tube and the pipe.

FIG. 8 is an illustration showing the drilling of inlet and outlet holes from FIG. 7.

FIG. 9 is a sectional drawing when plugging a perforation in the pipe wall following the processing step of FIG. 8.

DETAILED DESCRIPTION

Figure 1:
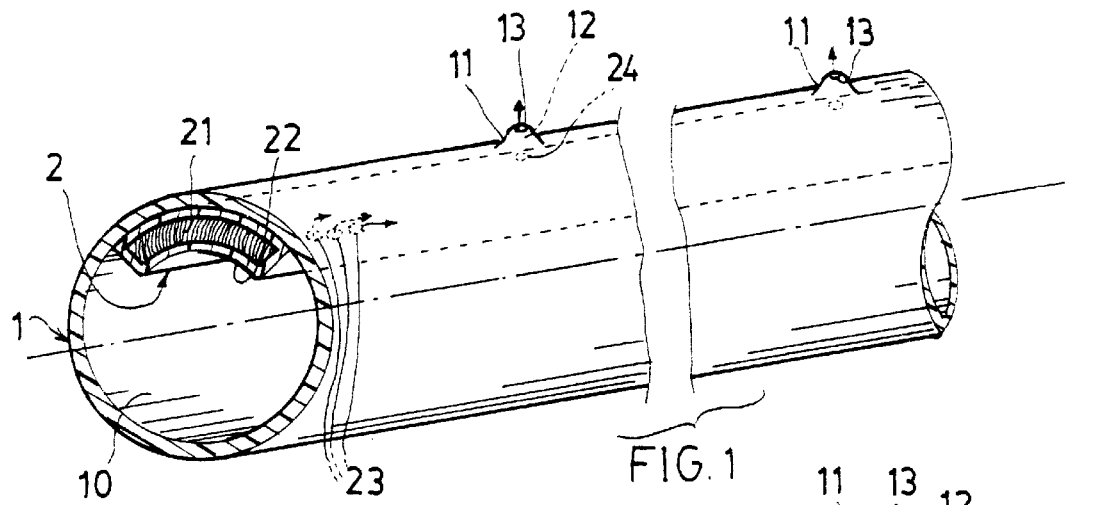
FIG. 1 is a perspective view of the present invention.
Figure 2:
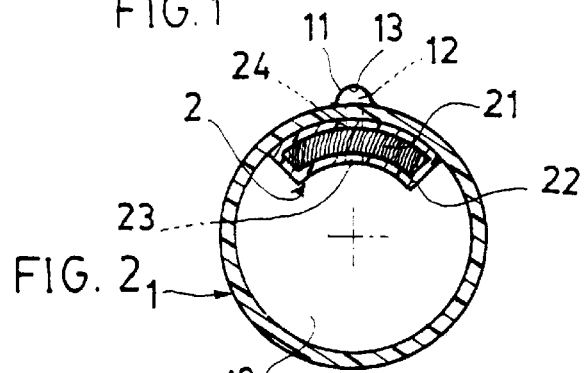
FIG. 2 is a cross sectional drawing of the present invention as shown in FIG. 1.

As shown in FIGS. 1~4, the drip irrigation pipe of the present invention comprises: a main pipe 1 having a buffer tube 2 lengthwise secured and juxtapositioned to an inside wall of the main pipe 1.

The buffer tube 2 includes a water-penetrable fibrous core member 21 clad in a tube wall 22, which may have a cross section of rectangular shape, arcuate or other shapes, such as made by coextrusion plastic molding process.

The water-penetrable fibrous core member 21 may be selected from: non-woven cloth, cotton cloth, fibrous strap, and other water penetrable fibrous materials. If the buffer tube 2 is made of polyethylene, the fibrous core member 21 is preferably a non-woven cloth.

The bottom of the buffer tube 2 is formed or drilled with a plurality of water inlet holes 23 respectively spaced apart in and longitudinally formed in the bottom of the buffer tube 2 to communicate with an interior in the main pipe 1 to direct water from the interior 10 into the buffer tube 2 through each water inlet hole 23. As shown in the drawing figures, the inlet holes 23 may be formed with plural groups of inlet holes 23, each group consisting of three (or other number) holes 23 as illustrated. The number of holes 23 are not limited.

A plurality of water outlets 24 are longitudinally formed and spaced apart in a top of the buffer tube 2, with each water outlet 24 being separated from and unaligned with each water inlet hole 23 for a proper distance to provide a water flowpath in the fibrous core member 21 for reducing the water pressure due to friction loss in the core member 21 and for filtering any dirts or dust laden in the water streamflow when the water is penetrated through the core member 21.

Each water outlet 24 is aligned and communicated with each drip outlet hole 13 formed in the main pipe 1.

The main pipe 1 includes a plurality of protrusions 11 spaced apart and longitudinally formed in the main pipe 1, each protrusion 11 defining a tiny buffer chamber 12 in the protrusion 11 as fluidically communicated with each water outlet 24 of the buffer tube 2, and each protrusion 11 drilled or formed with a drip outlet hole 13 in a top of the protrusion 11 for discharging water drips from the tiny buffer chamber 12 through the drip outlet hole 13.

Accordingly, any water entering the buffer tube 2 will be penetrated into the fibrous core member 21 in the buffer tube 2 to diffuse into so many capillary fine streamflows through the fibrous materials in the core member 21 to thereby greatly decrease the fluid pressure. The water streamflow as dampened and filtered in the fibrous core member 21 will then be directed into each tiny buffer chamber 12 for further reducing the fluid pressure and then discharge through each drip outlet hole 13 for final irrigation use.

The fibrous core member 21 may be pre-sterilized or be made of bacteria-free material during the production process for enhancing the hygienic function and prolonging the service life of the present invention.

Each pipe 1 may be formed or joined with flanges, joints, adapters, valves and other piping accessories for a complete irrigation system for agriculture, gardening or relevant end uses.

Figure 3:
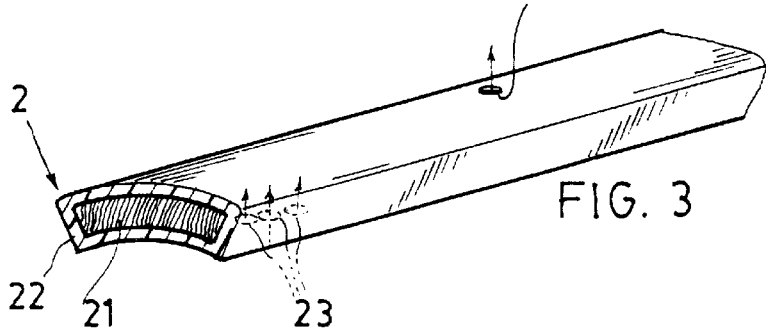
FIG. 3 is a perspective view of the buffer tube of the present invention.
Figure 4:
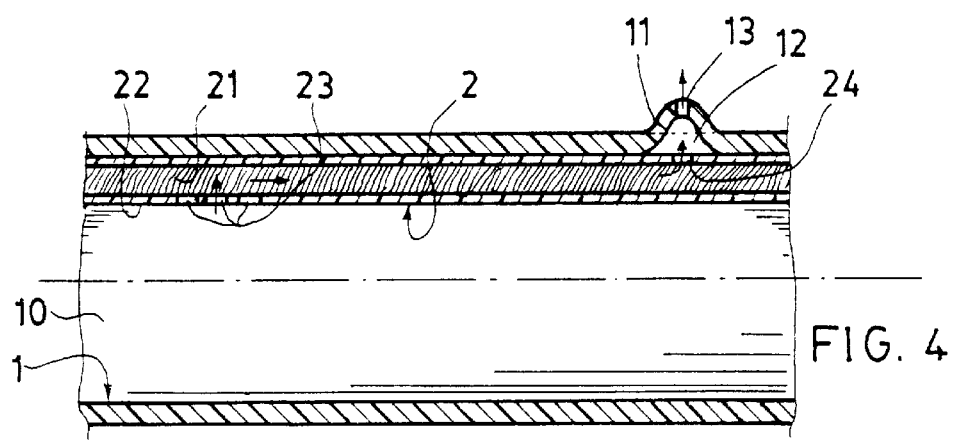
FIG. 4 is a partial longitudinal sectional drawing of the present invention.

As shown in FIG. 3, the buffer tube 2 is preformed by extrusion process. After forming the related outlets or holes 23, 24, the buffer tube 2 is then secured to an inside wall of the main pipe 1 to coincide each water outlet 24 with each drip outlet hole 13 formed in the main pipe 1. The tube 2 may be secured to the pipe 1 by adhesive bonding, welding, thermal joining or any other joining methods.

Another preferred embodiment of the present invention is shown in FIGS. 5~9. The drip irrigation pipe comprises: a main pipe 1 having a plurality of protrusions 11 longitudinally formed in the main pipe 1, each protrusion 11 formed with a drip outlet hole 13 therein; a buffer tube 2 integrally formed with the main pipe 1 and having a water-penetrable fibrous core member 21 clad in the buffer tube 2, having a plurality of water inlet holes 23 longitudinally formed in a bottom of the buffer tube 2 with each water inlet hole 23 separated from each drip outlet hole 13 in a distance, each drip outlet hole 13 fluidically communicated with an outlet port 24 on a top of the core member 21 adjacent to an inside wall surface of the main pipe 1 for discharging filtered and dampened water through the core member 21, a tiny buffer chamber 12 formed in each protrusion 11 and the drip outlet hole 13.

Each protrusion 13 may be made by thermoforming or vacuum forming processes on the pipe wall of the main pipe 1. The main pipe 1, the buffer tube 2 and the fibrous core member 21 may be integrally formed by co-extrusion molding process.

The holes 23, 13 in the tube 2 and pipe 1 may be formed in accordance with the following procedures as illustrated in FIGS. 7~9:

The main pipe 1 and the buffer tube 2 are integrally formed as shown in FIG. 7, but not yet drilled with any water holes therein. Then, each protrusion 13 is drilled by a tool T for a drip outlet hole 13 and an water inlet hole 23 is drilled in front of each drip outlet hole 13 by a longer tool T1 which also drills a perforation 14 in the main pipe 1. Therefore, a plug 15 is inserted into the perforation 14 to seal the perforation, allowing a water flowpath from the inlet hole 23, the fibrous core member 21, the outlet port 24, the tiny buffer chamber 12 to be finally discharged through the drip outlet hole 13. The water is then filtered, dampened for obtaining water drips with homogeneous decreased pressure and higher purity beneficial for irrigation end uses.

The aforementioned tool T may be substituted with any other drilling methods, such as effected by laser, by heat or any other tools or methods, not limited in the present invention. The plug 15 for sealing the perforation 14 may also be modified to be other sealing methods or materials, for instance, a hot-melted adhesive which may be provided for sealing the perforation 14.

Figure 10:
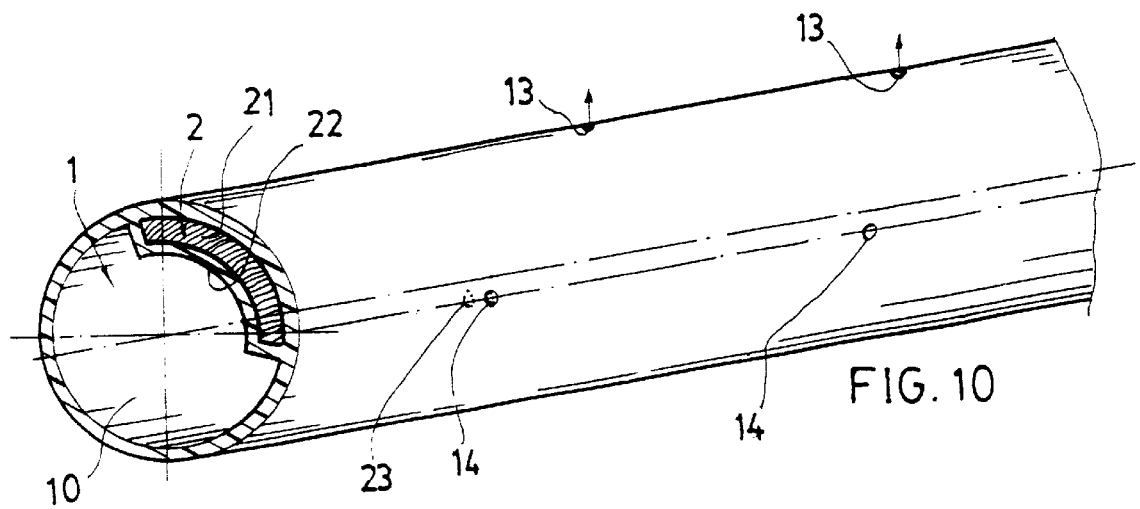
FIG. 10 shows still another preferred embodiment of the present invention.
Figure 11:
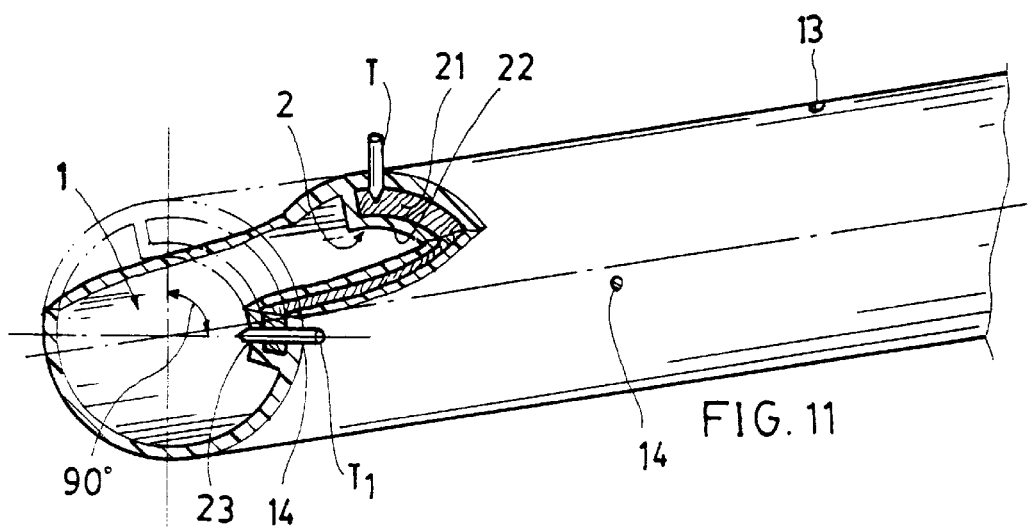
FIG. 11 shows a drilling on the pipe and tube as shown in FIG. 10.
Figure 12:
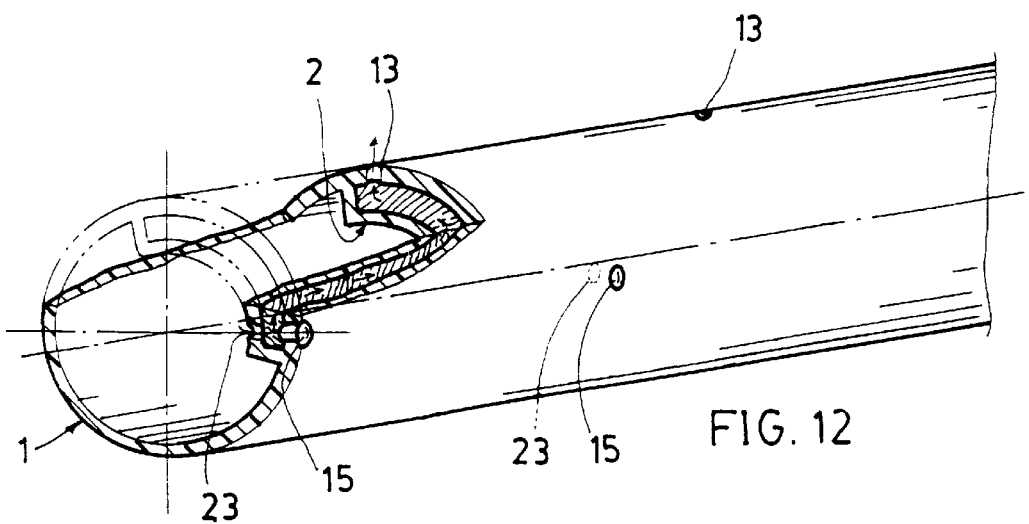
FIG. 12 is an illustration showing the completion of the pipe as shown in FIG. 10.

Still another preferred embodiment of the present invention is shown in FIGS. 10~12, in which, the protrusions 11 on the main pipe 1 are eliminated and the drip outlet holes 13 may be directly drilled on the main pipe 1 in a predetermined space or distance; and the water inlet holes 23 may be drilled with a longer tool T1 or by other method for forming a "deep hole" including a perforation 14 formed in the outer main pipe 1, thereby requiring a further sealing 15 on the perforation 14 as shown in FIG. 12. In this example, the inlet hole 23 is generally projectively separated from the outlet hole 13 at ninety degrees (FIG. 11) for obtaining a longer water flowpath for effectively dampening the water streamflow and for filtering off any dirts laden in the water streamflow.

For helping installation of the present invention at a desired orientation for emitting the water drips, the drip outlet holes 13 may be marked with colors for an easy identification for well constituting the piping system in accordance with the present invention.

The present invention provides a simplified drip irrigation pipe for reducing production cost, but increasing the installation convenience. The water, when flowing through the pipe of the present invention, will be filtered for obtaining a clear liquid and dampened for obtaining a low pressure liquid simultaneously.

The present invention may be modified without departing from the spirit and scope of the present invention. The raw materials for making the elements of the present invention are not limited. The buffer tube 2 may be formed with a thin film in which the core member 21 is clad within the film.

I claim:

1. A drip irrigation pipe comprising:

a main pipe having a plurality of drip outlet holes longitudinally formed in said main pipe; and a buffer tube lengthwise formed in and integrally formed with said main pipe and juxtapositioned to an inside wall of said main pipe, having a water-penetrable core member clad in said buffer tube and a plurality of water inlet holes longitudinally formed in a tube wall of said buffer tube, said buffer tube having a plurality of water outlets formed thereon to be communicated with said drip outlet holes in said main pipe, whereby water flowing in an interior of said main pipe will enter said buffer tube through said water inlet holes to be filtered and dampened in said core member to obtain water drips, which leave said buffer tube through said water outlets and are discharged with decreased pressure through said drip outlet holes for irrigation use.

2. A drip irrigation pipe according to claim 1, wherein said water-penetrable core member is made of fibrous material, in which water is penetrable.

3. A drip irrigation pipe according to claim 1, wherein said water-penetrable core member is a non-woven cloth.

4. A drip irrigation pipe according to claim 1, wherein said buffer tube and said main pipe are integrally formed by co-extrusion process.

5. A drip irrigation pipe according to claim 1, wherein said main pipe is formed with a plurality of protrusions longitudinally on said main pipe, each said protrusion having a tiny buffer chamber formed therein, and having each said drip outlet hole formed in a top of said protrusion and fluidically communicated with said tiny buffer chamber, said core member in said buffer tube and said interior in said main pipe.

6. A drip irrigation pipe according to claim 1, wherein said buffer tube has each said water inlet hole formed in a bottom portion of said buffer tube, and having each said water outlet formed on a top of said buffer tube and fluidically communicated with each said drip outlet hole.

7. A drip irrigation pipe according to claim 1, wherein said buffer tube is joined to an inside wall of said main pipe and fluidically communicated with an interior in said main pipe.

8. A drip irrigation pipe according to claim 1, wherein said water-penetrable core member is made of foam material which is water penetrable.

9. A drip irrigation pipe according to claim 1, wherein said buffer tube includes a tube wall in which said water-penetrable core member is clad within said tube wall; said tube wall having at least a water inlet hole formed in a first portion in said tube to be communicated with an interior in said main pipe, and having a water outlet formed in a second portion in said tube to be communicated with said drip outlet hole in said main pipe.

10. A drip irrigation pipe according to claim 9, wherein said tube wall of said buffer tube is made of a film material.

* * * * *